(12) United States Patent
Hemby et al.

(10) Patent No.: US 11,623,135 B2
(45) Date of Patent: *Apr. 11, 2023

(54) TOUCHSCREEN GAME USER INTERFACE

(71) Applicant: Zynga Inc., San Francisco, CA (US)

(72) Inventors: Matthew Hemby, Hove (GB); Kevin Michael Adsett, Hove (GB); Jameson Francis Thatcher, Hove (GB)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,383

(22) Filed: Jun. 29, 2021

(65) Prior Publication Data
US 2021/0322867 A1    Oct. 21, 2021

Related U.S. Application Data

(63) Continuation of application No. 16/595,831, filed on Oct. 8, 2019, now Pat. No. 11,071,906.

(51) Int. Cl.
| | | |
|---|---|---|
| *A63F 13/2145* | (2014.01) | |
| *A63F 13/537* | (2014.01) | |
| *G06F 3/04883* | (2022.01) | |
| *G09G 5/377* | (2006.01) | |
| *G06F 3/04847* | (2022.01) | |

(Continued)

(52) U.S. Cl.
CPC ........ *A63F 13/2145* (2014.09); *A63F 13/537* (2014.09); *G06F 3/0482* (2013.01); *G06F 3/04847* (2013.01); *G06F 3/04883* (2013.01); *G09G 5/377* (2013.01); *A63F 13/837* (2014.09); *A63F 2300/1075* (2013.01); *A63F 2300/303* (2013.01); *G09G 2354/00* (2013.01)

(58) Field of Classification Search
CPC .. A63F 13/2145; A63F 13/537; A63F 13/837; A63F 2300/1075; A63F 2300/303; G06F 3/0482; G06F 3/04883; G06F 5/377; G09G 2354/00
See application file for complete search history.

(56) References Cited

U.S. PATENT DOCUMENTS 9,004,997 B1    4/2015   Prosin et al.
10,456,667 B2   10/2019  Tang et al.
(Continued)

FOREIGN PATENT DOCUMENTS

WO    WO-2021072081 A1    4/2021

OTHER PUBLICATIONS

U.S. Appl. No. 16/595,831, U.S. Pat. No. 11,071,906, filed Oct. 8, 2019, Touchscreen Game User Interface.
(Continued)

*Primary Examiner* — Tramar Harper
(74) *Attorney, Agent, or Firm* — Schwegman Lundberg & Woessner, P.A.

(57) ABSTRACT

A swipe input mechanism for a computer-implemented game presented on a touchscreen allows for user-selection of different menu options by swipe gestures in different directions via a swipe menu dedicated to receiving such swipe input. In a third person shooter game or a first-person shooter game user-selection of different character abilities are enabled via the swipe menu. The swipe menu is a floating user interface element that auto-adjusts its on-screen position to register with the position of user touch.

18 Claims, 11 Drawing Sheets

(51) Int. Cl.
*G06F 3/0482* (2013.01)
*A63F 13/837* (2014.01)

(56) References Cited

U.S. PATENT DOCUMENTS

| | | | |
|---|---|---|---|
| 10,786,733 B2 | 9/2020 | Tang et al. | |
| 11,071,906 B2 | 7/2021 | Hemby et al. | |
| 2011/0172013 A1 | 7/2011 | Shirasaka et al. | |
| 2012/0242590 A1 | 9/2012 | Baccichet et al. | |
| 2012/0327106 A1* | 12/2012 | Won | A63F 13/843 |
| | | | 345/173 |
| 2013/0038623 A1 | 2/2013 | Tezuka et al. | |
| 2014/0066195 A1 | 3/2014 | Matsui et al. | |
| 2014/0248948 A1 | 9/2014 | Ho et al. | |
| 2016/0132209 A1 | 5/2016 | Abe | |
| 2016/0317915 A1 | 11/2016 | Onda | |
| 2018/0021672 A1 | 1/2018 | Baba | |
| 2018/0028906 A1 | 2/2018 | Tang et al. | |
| 2018/0028907 A1 | 2/2018 | Weng et al. | |
| 2018/0028914 A1 | 2/2018 | Yamaguchi | |
| 2018/0043260 A1 | 2/2018 | Tang et al. | |
| 2018/0185747 A1* | 7/2018 | Li | A63F 13/58 |
| 2018/0200616 A1 | 7/2018 | Li et al. | |
| 2018/0260545 A1* | 9/2018 | Chen | G06F 3/0482 |
| 2018/0311582 A1 | 11/2018 | Gerhard et al. | |
| 2018/0373376 A1 | 12/2018 | Kurabayashi | |
| 2019/0070495 A1 | 3/2019 | He | |
| 2019/0070496 A1 | 3/2019 | He | |
| 2019/0091561 A1 | 3/2019 | Li | |
| 2019/0265882 A1 | 8/2019 | Nakahara | |
| 2019/0366213 A1 | 12/2019 | Zhou | |
| 2020/0155941 A1 | 5/2020 | Ito | |
| 2021/0038987 A1* | 2/2021 | Lin | A63F 13/80 |
| 2021/0101074 A1 | 4/2021 | Hemby et al. | |

OTHER PUBLICATIONS

U.S. Appl. No. 16/595,831, filed Oct. 8, 2019, Touchscreen Game User Interface.
"U.S. Appl. No. 16/595,831, Corrected Notice of Allowability dated May 12, 2021", 2 pgs.
"U.S. Appl. No. 16/595,831, Non Final Office Action dated Nov. 13, 2020", 14 pgs.
"U.S. Appl. No. 16/595,831, Notice of Allowance dated Mar. 24, 2021", 12 pgs.
"U.S. Appl. No. 16/595,831, Response filed Mar. 15, 2021 to Non Final Office Action dated Nov. 13, 2020", 13 pgs.
"International Application Serial No. PCT/US2020/054793, International Search Report dated Jan. 26, 2021", 3 pgs.
"International Application Serial No. PCT/US2020/054793, Written Opinion dated Jan. 26, 2021", 4 pgs.
"Mobile Legends: Bang Bang—Gameplay alkthrough Part 1", TapGameplay, (Apr. 15, 2018).
Dena'S Scattered Entertainment, "Touchscreen FPS controls of the Drowning", [Online]. Retrieved from the Internet: <https://www.youtube.com/watch?v=sJoSJcERywg>, (Feb. 14, 2013), 2 minutes 43 seconds.
"International Application Serial No. PCT US2020 054793, International Preliminary Report on Patentability dated Apr. 21, 2022", 6 pages.

* cited by examiner

TOUCHSCREEN GAME USER INTERFACE

This application is a continuation of U.S. patent application Ser. No. 16/595,831, filed Oct. 8, 2019, which is incorporated herein by reference in its entirety.

BACKGROUND

Computer games are increasingly being made available for play across a variety of different types of devices. By virtue of the different natures of different types of devices (e.g., gaming consoles, PCs, and mobile touchscreen devices), the user interfaces for such different platforms are also different and provide different respective advantages and drawbacks.

Traditionally, games such as first-person shooters (FPS), in which speed and precision of user control is a great importance and in which a number of different character abilities are available for selective deployment, have been primarily available on devices with separate manual input devices such as mouse and keyboard (for PCs) or a dedicated controller (for gaming consoles). Recently, such games have increasingly been made available for play on mobile devices with touchscreen input, such as mobile phones, tablets, or touchscreen laptops.

Existing game user interfaces on touchscreen devices, however, have a number of disadvantages over console or PC input mechanisms. One such example is where different character abilities are selectable by haptic selection of different respective soft buttons. In particular, the speed and accuracy of button selection is problematic on small screens where the buttons to be selected are often obscured by the user's hand, where haptic feedback from elements such as control sticks and physical buttons are unavailable, and where limited screen space is available for display of all selectable ability buttons.

INTRODUCTION

This disclosure provides for a swipe input mechanism that allows for user selection of different menu options on a touchscreen by swipe gestures in different directions via a user interface element or widget dedicated to receiving such swipe input. This enables the depth and complexity of inputs offered by PC or Console input devices to be achieved without the loss in speed and tap accuracy typical to touch screen devices.

One aspect of the disclosure thus provides for a method comprising:

generating on a touchscreen of a mobile user device a game display that shows in-game action of a computer-implemented game, the in-game action comprising user-controlled movement of a player character within a virtual world;

providing a movement control mechanism that enables user control of movement of the player character via touchscreen input;

providing a swipe input mechanism that enables selective deployment of a plurality of abilities of the player character by different respective swipe inputs via the touchscreen in a corresponding plurality of trigger directions;

detecting a swipe input via the swipe input mechanism;

identifying the trigger direction selected by the swipe input; and causing in-game deployment for the player character of that one of the plurality of abilities which corresponds to the selected trigger direction.

Providing the swipe input mechanism may comprise displaying as part of a heads-up display (HUD) overlaid on the game display an abilities widget, the plurality of trigger directions extending radially relative to a center defined by the abilities widget, with at least two of the plurality of trigger directions being transverse to one another and intersecting at the center. In some embodiments, the trigger directions may be the four cardinal directions oriented horizontally and vertically (i.e., up, down, left, and right). In other embodiments, more or fewer swiping directions may be supported.

In some embodiments, the abilities widget comprises a plurality of ability elements arranged circumferentially about the center, each ability element being a graphic user interface element that is user-selectable by a radially outward swipe input extending from the center in a corresponding one of the plurality of trigger directions. The ability elements may in some embodiments be movable responsive to swiping (e.g.; buttons or tactile sliding badges), but it may in other embodiments be selectable simply by swiping over them.

In some embodiments, the method further comprises:

switching one or more of the plurality of ability elements between a ready state in which the corresponding ability is available for selection, and an unready state in which the corresponding ability is unavailable for selection; and responsive to switching a particular ability element between the ready state and the unready state, providing a visual indication of the switching by varying one or more visual attributes of the particular ability element.

In one example embodiment, the visual indication comprises applying different color schemes based on readiness.

The unready state for at least one of the plurality of ability elements may comprise a charging mode in which a charge level for the corresponding ability progressively increases towards a predefined charge threshold at which the ability element automatically switches to the ready state. The method may in such embodiments further comprise displaying in association with the respective ability element a dynamic charge indicator that graphically indicates the charge level for the corresponding ability. In some embodiments, each ability element comprises a slidable trigger button. In such embodiments, each dynamic charge indicator may comprise a charge ring about the corresponding trigger button, the charge ring being progressively filled annularly to indicate the charge level for the associated ability.

As mentioned, the plurality of ability elements may comprise, for each of the plurality of trigger directions, a respective trigger button that is radially slidable relative to the center in the corresponding trigger direction. In such cases, the method may further comprise displaying animated sliding movement of the trigger button corresponding to the selected trigger direction responsive to the detected swipe input. Switching a particular ability element to the ready state made some embodiments comprise extending a firing lane radially outwards from the particular ability element; the corresponding trigger button being slidable along the firing lane. The firing lane may be automatically retracted when the ability is in the unready state.

The abilities widget in some embodiments has a dynamically variable on-screen position that automatically adjusts to an origin point for swipe input. The method may in such embodiments comprise:

prior to receiving the swipe input, detecting initiation of touch contact for swipe control of the abilities widget;

identifying on-screen coordinates of the touch contact initiation as the origin point for swipe input; and automatically adjusting the on-screen position of the abilities widget such the center of the abilities widget is located at the identified origin point.

The detection of touch contact for swipe control of the abilities widget may be limited to a predefined abilities control area that forms a subset of a total input-receptive area of the touchscreen, the method comprising detecting a touch input as initiation of touch contact for swipe control of the abilities widget responsive to and conditional upon satisfaction of on a set of criteria. In one embodiment, the set of criteria for identifying initiation of swipe contact comprises: that the touch input is received in the abilities control area; and that the touch input is sustained for longer than a predefined threshold interval.

Some of the selectable abilities may support an aiming function, such as to allow user selection of the particular direction and/or distance an object is to travel. In such instances, in-game deployment of the selected ability may comprise:

entering an aiming mode in which a trajectory or a target area for the selected ability is displayed while touch contact that provided the swipe input is sustained;

changing the displayed trajectory or target area responsive to user-provided change in position of the sustained touch contact; and upon release of the touch contact, deploying the selected ability according to the displayed trajectory or target area.

BRIEF DESCRIPTION OF TUE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
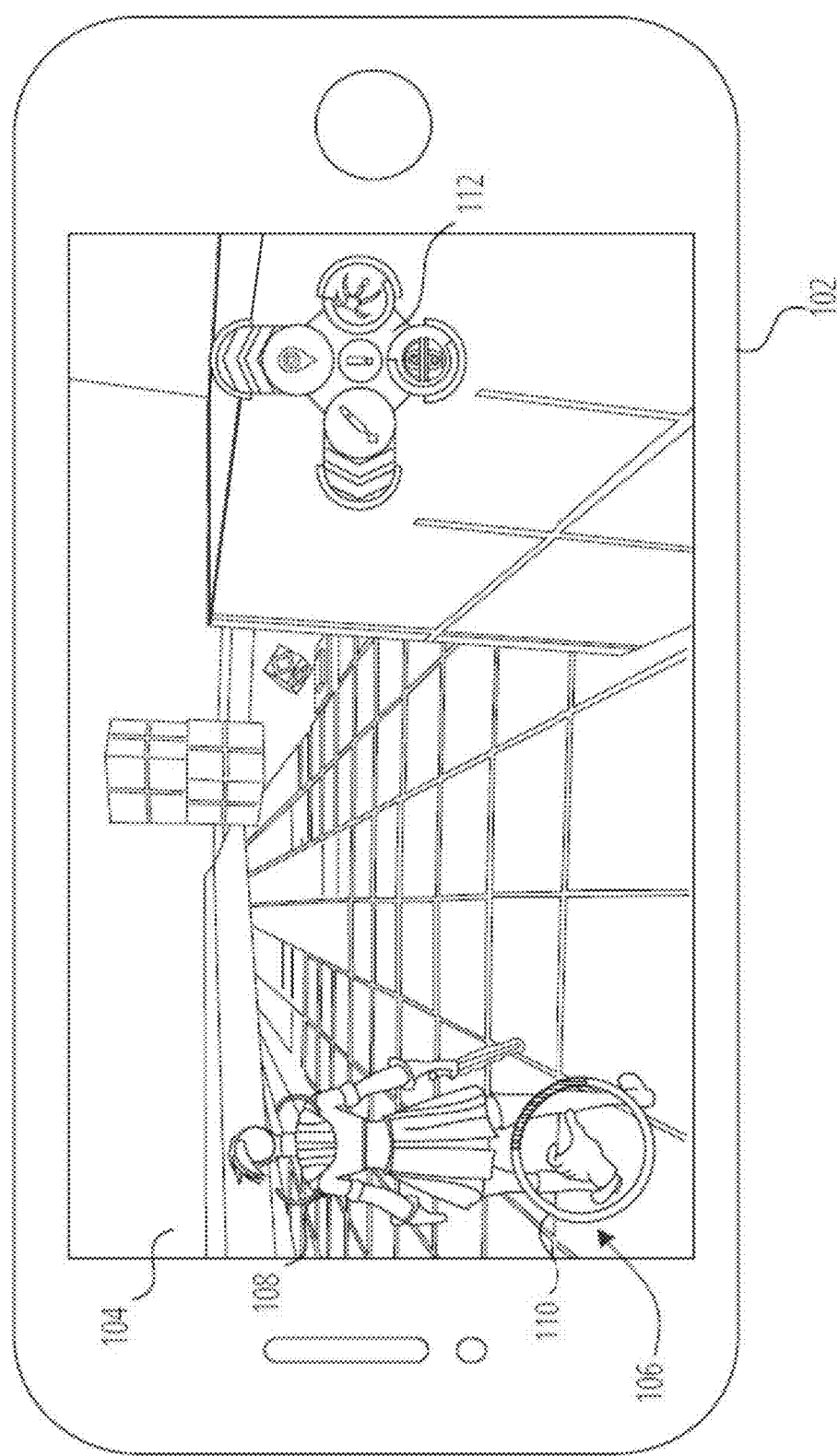
FIG. 1 is a schematic view of a mobile electronic device configured to host a computer-implemented game having an interactive game user interface provided on a touchscreen forming part of the device, according to an example embodiment.

FIG. 1 shows a schematic depiction of a mobile phone 102 having a touchscreen 104 on which a game display 106 is provided. In this example embodiment, the game display 106 is for a computer-implemented third-person shooter (FPS) game. In conventional fashion, the game display 106 thus shows in-game action comprising user-controlled movement of a player character 108 within a virtual world in which gameplay is set. Gameplay comprises moving through the virtual three-dimensional world to achieve predefined objectives against other player characters (PCs) or nonplayer characters (NPCs). In this example embodiment, user-controlled functions of the character 108 include movement, controlling direction of view/aim, jumping, melee, shooting, and the deployment of a number of predefined special skills or abilities. As will be described below, these abilities include, inter alia, switching to a map view, deploying a grappling hook, throwing a grenade, and deploying a special weapon such as a rocket or the like. It will be appreciated that the above-listed actions and abilities provide a nonexhaustive list of functions that are controllable in this or in other embodiments by means of a user interface according to the disclosure.

The game display 106 is presented on the touchscreen 104, which also serves as an exclusive input device to control the in-game behavior of the player character 108 via manual haptic or touch input by the user. The game display 106 on the touchscreen 104 thus provides a user interface for both displaying in game action and for receiving user input. The game display 106 includes a heads up display (HUD) that comprises a number of graphical user interface (GUI) elements with which the user can interact to control operation of the character 108.

In the example embodiment of FIG. 1, the HUD comprises a movement control mechanism in the form of a movement element 110 that enables user control of movement of the character 108 within the virtual world. The HUD further comprises a swipe input mechanism that enables selective deployment of a plurality of different abilities of the character 108 by swipe gestures in different respective directions. In this example embodiment, the swipe input mechanism comprises an abilities widget 502 that provides for triggering four different abilities of the character 108 by swiping in one of the four cardinal directions (up, down, left or right). The particular behaviors and functions the abilities widget 502 of the example embodiment of FIG. 1 will be described in greater detail below with reference to FIG. 2 through FIG. 4.

Figure 5:
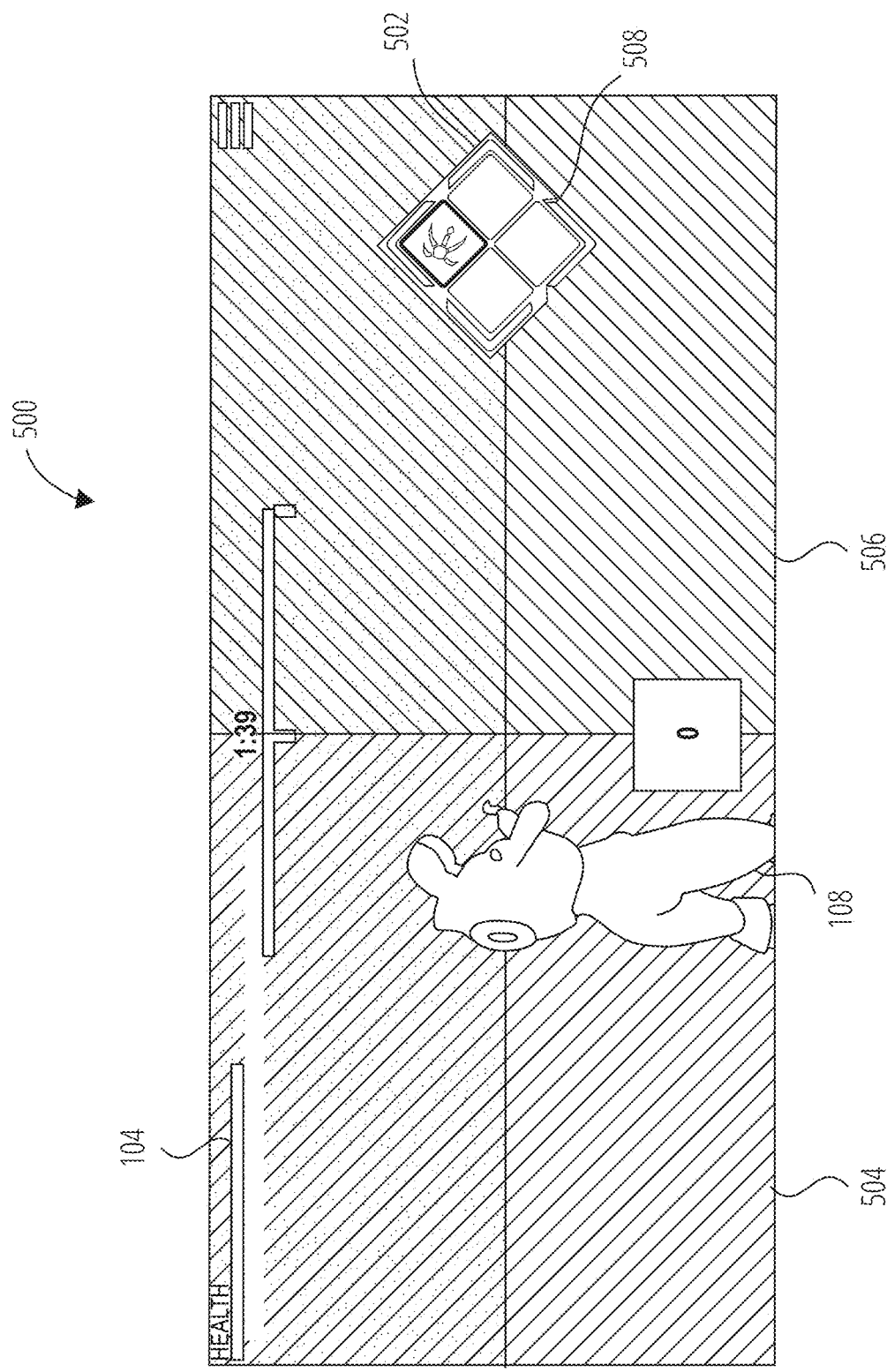
FIG. 5 illustrates a game display 500 that schematic shows three different predefined areas on a touchscreen for receiving touch input for different respective control purposes.

Before discussing in-depth the functionalities provided by the abilities widget 502, we briefly turn to FIG. 5, which illustrates a mechanism for automatically discriminating between touch input provided for different respective purposes. In the example embodiment of FIG. 5, the user interface provided by the game display 106 automatically discriminates, based on onscreen location of touch initiation, between touch input for controlling (a) character movement, (b) look direction, and (c) deployment of special abilities by means of swipe gestures.

FIG. 5 shows a stylized schematic view of a game display 500 according to another embodiment, in which the abilities widget 502 has a different shape and configuration from that discussed with reference to FIG. 1 through FIG. 4. The mechanism for discriminating between the inputs for the different respective purposes, however, functions similarly for the embodiments of FIG. 1 and FIG. 5. In these example embodiments, distinguishing between different types of touch input is based on predefined segregated regions or areas of the touchscreen 104, indicated in different colors in FIG. 5 exclusively for ease of description. The game display 500 includes a movement control area 504 (hatched diagonally descending rightwards), a look control area 506 (hatched diagonally ascending rightwards), and an abilities control area 508 (unhatched). Touch input received in the movement control area 504 is automatically identified as input directed to controlling movement of the character 108, while touch input received in the look control area 506 is automatically identified as input directed to controlling the direction in which the character 108 is looking or aiming, as the case may be. Only touch input initiated in the abilities control area 508, however, is identified as input received for swipe control of the abilities widget 502. As will be described later herein with reference to other example embodiments, the abilities widget 502 has a dynamically variable on-screen position that dynamically adjusts to an origin point for swipe input. In this example embodiment, responsive to detecting initiation of touch contact for swipe control of the abilities widget. 502 (e.g., responsive to detecting the initiation of touch contact in the abilities control area 508), the mobile phone 102 automatically identifies as an origin point the on-screen coordinates of that touch input, and automatically adjusts the on-screen position of the abilities widget 502 such that it is centered on the origin point. As will become evident from what follows, such dynamically responsive auto positioning of the abilities widget 502 promotes ease of use and accuracy of interpreting user intentions communicated through swipe gestures directed at the abilities widget 502.

Figure 2:
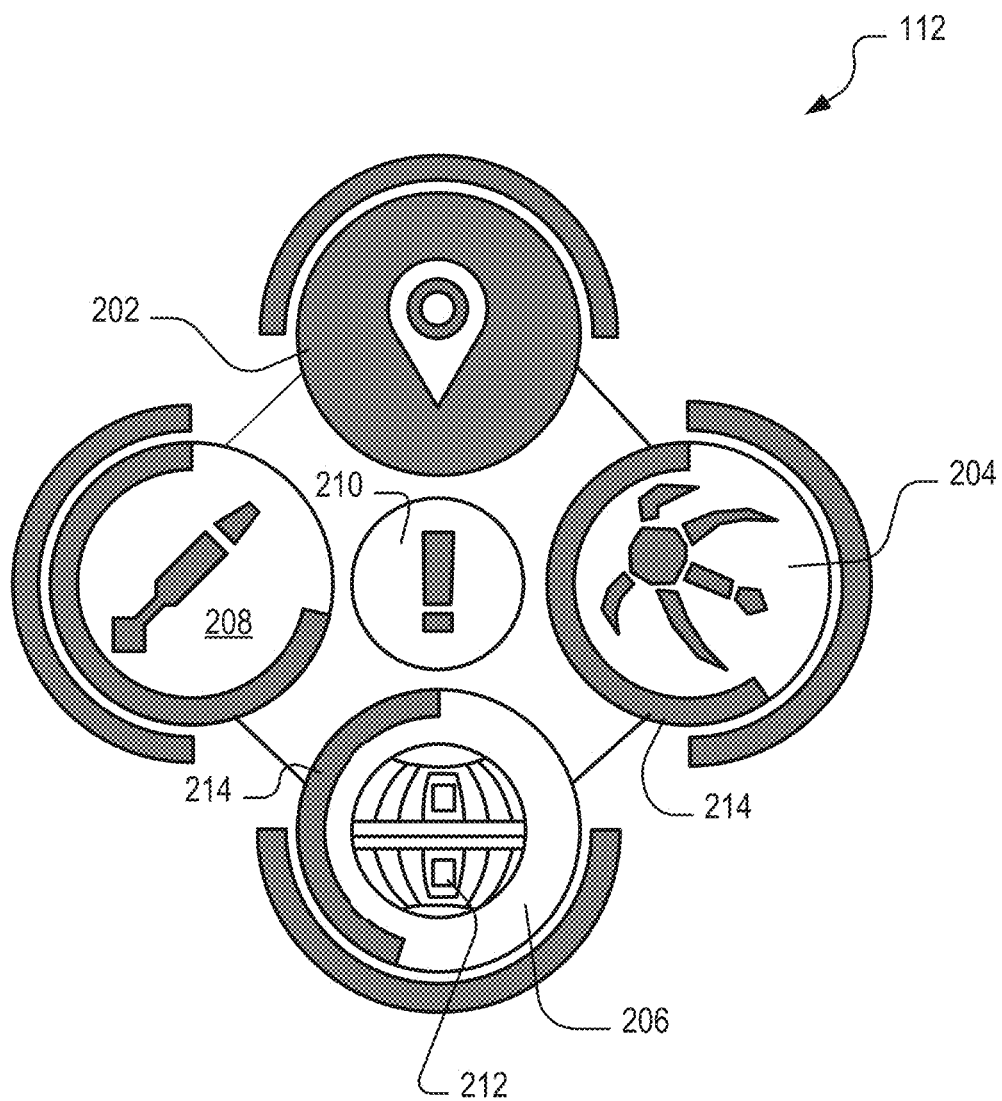
FIG. 2 is an isolated view, on an enlarged scale, of and abilities widget forming part of the game user interface of FIG. 1, according to an example embodiment, the abilities widget being in a dormant mode in which there is no user interaction with the abilities widget.
Figure 3:
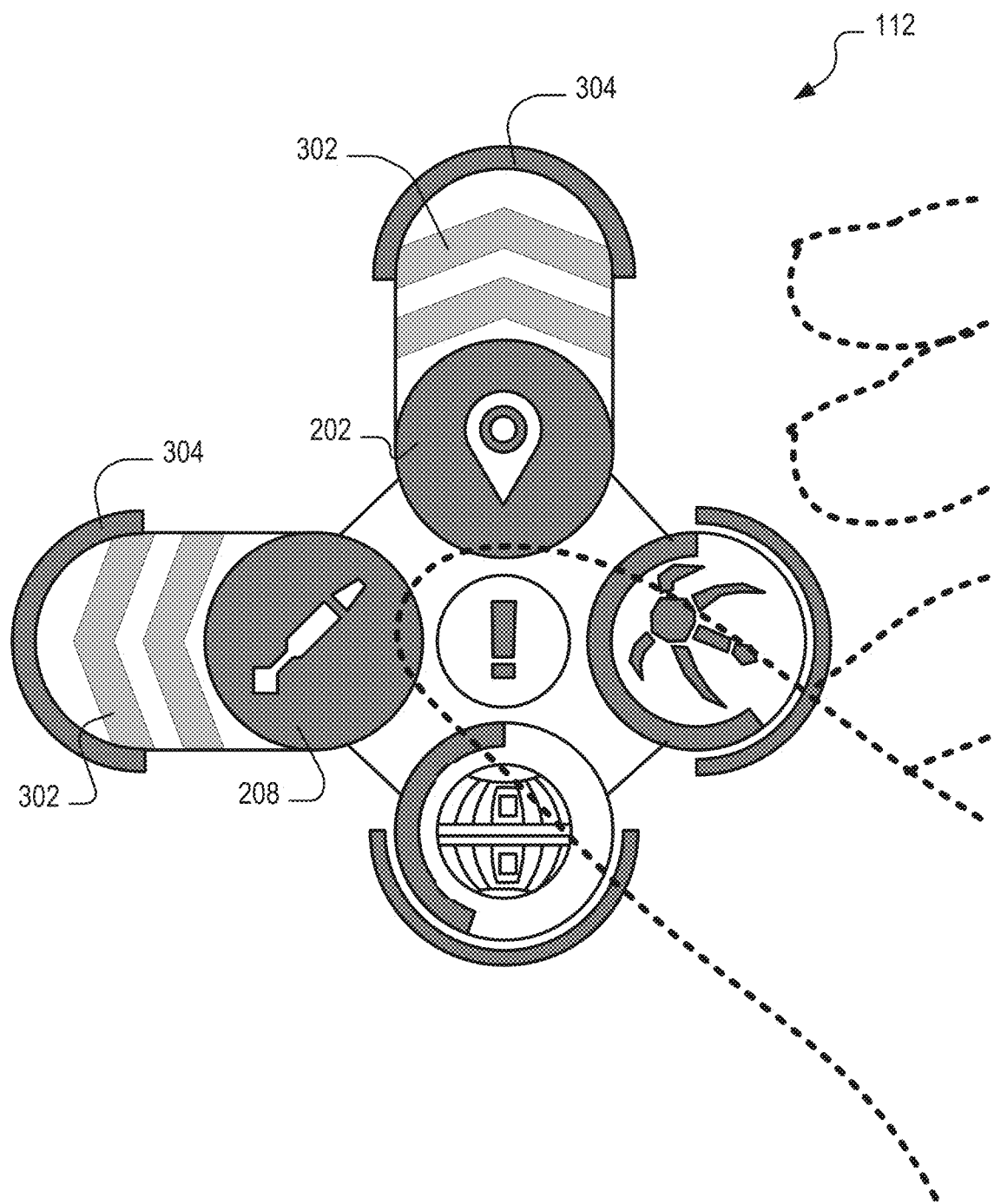
FIG. 3 is a view corresponding to FIG. 2, the abilities widget being in an active mode responsive to a press-and-hold haptic interaction with the abilities widget by a user, according to one example embodiment.
Figure 4:
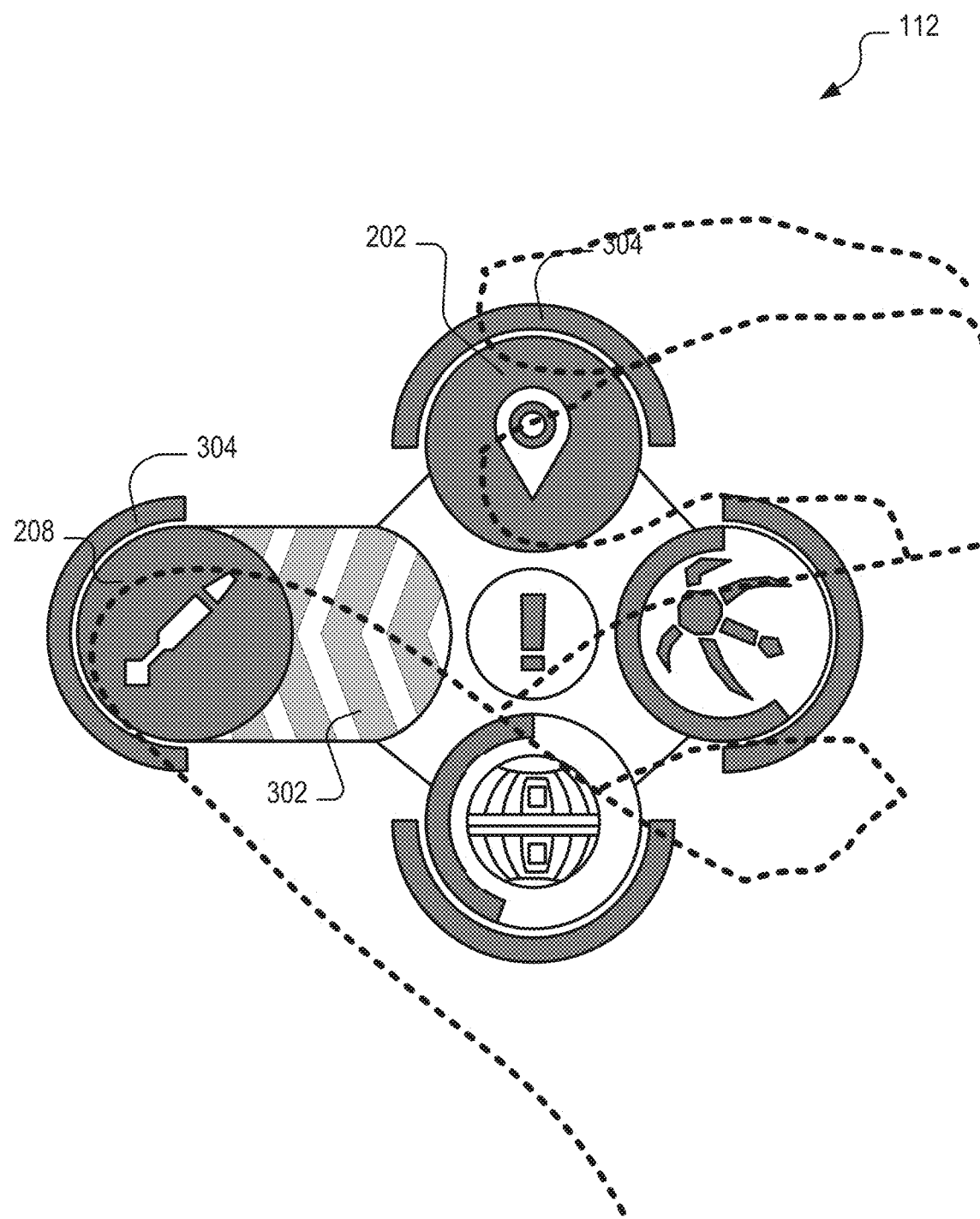
FIG. 4 is a view corresponding to FIG. 3, showing the user-selection of an in-game ability supported by the abilities widget, according to one example embodiment.

FIG. 2 through FIG. 4 schematically illustrate operation of the abilities widget 112 according to the example embodiment of FIG. 1, the abilities widget 112 being shown in isolation. As can be seen in FIG. 2, the abilities widget is an interactive user interface element that comprises a plurality of swipable ability elements in the example form of four trigger buttons that can be swiped in different respective trigger directions to deploy different respective in-game abilities or special skills for the character 102. (See, for example, FIG. 4 in which one of the abilities supported by the abilities widget 112 is deployed by a swipe gesture in the corresponding trigger direction). In the example embodiment of FIG. 2, the trigger buttons provided by the abilities widget 112 are:

a ping button 202 that can be swiped upwards to look at a map of the game world or to view an enemy position;

grappling hook button 204 that can be swiped horizontally rightwards to deploying a grappling hook;

a grenade button 206 that can be swiped vertically downwards to throw a grenade or, in this example embodiment, enter a grenade aim and release mode as will be described later; and a rocket button 208 that can be swiped horizontally leftwards (see FIG. 4) to launch a rocket.

A center and swiping origin point of the abilities widget 112 is provided by a central pad 210 located at the intersection of the horizontal and vertical trigger directions, so that the four trigger directions extend radially relative to the central pad 210. As mentioned previously, the abilities widget 112 is in this example embodiment a floating HUD element, being dynamically variable in on-screen position to automatically register with the user's finger placement for providing swipe input to the abilities widget 112. Thus, when the user initiates touch contact in the abilities control area 508 (FIG. 5) and holds contact for more than a predefined lower threshold period (so as to distinguish between tap input and the initiation of a swipe gesture), the mobile phone 102 automatically identifies the on-screen coordinates of the touch contact, and immediately moves the abilities widget 112 such that the central pad 210 is located at the identified coordinates. In this manner, the mobile phone 102 automatically and responsively ensures that the central pad 210 is located at the origin point of any swipe gesture inputted to the abilities widget 112. As will be described below, the central pad 210 in this example embodiment also functions as a help button for launching a helper overlay panel by holding the central pad 210 for longer than a predefined upper threshold without swiping one of the trigger buttons.

Each of the trigger buttons has a respective icon 212 that graphically indicates the particular ability or skill that can be triggered by that button. In this example embodiment, each icon 212 additionally indicates whether or not the corresponding ability is available for selection. Each trigger button is operable between an unready state (in which the ability is not available) and a ready state in which the ability is available for selection. Switching of a trigger button from unready to ready is indicated by varying visual attributes of the icon 212 of that trigger button. In this example embodiment, the color schemes of ready buttons and unready buttons are inverted relative to one another. Thus, in the view of FIG. 2, for example, the ping button 202 is in the ready state, having a darker background and a lighter foreground image. In contrast, the rocket button 208, grappling hook button 204, and grenade button 206 are in the unready state, having darker backgrounds and lighter foreground images. In this example embodiment the trigger buttons in the unready state are in a cooldown period charging mode where a charge level for the ability progressively increases towards a charge level at which the ability becomes available. In some instances, each ability thus has a recharge period subsequent to deployment before the ability can be used again. Each trigger button in the charging mode includes a dynamic charge indicator in the form of a charge ring 214 that extends circumferentially around the periphery of the trigger button, the charge ring 214 progressively filling annually to indicate the charge level for the corresponding ability. Thus, when the charge ring 214 for a particular ability is filled, the color scheme for the corresponding icon 212 is inverted to indicate that the relevant ability is available. Compare, for example, the appearance of the rocket button 208 while charging (FIG. 2) and when available for deployment (FIG. 3).

In this example embodiment, the abilities widget 112 automatically switches between a dormant mode (FIG. 2) when the user does not interact with it, and an active mode (FIG. 3 and FIG. 4) during haptic engagement of the abilities widget 112 by the user. The major difference between the abilities widget 112 in the dormant mode and the active mode in this example embodiment is the display of a gesture lane or firing lane for each fully charged trigger button. In the active mode, responsive to touch input in the abilities control area 508, each trigger button in the ready mode is provided with a respective firing lane 302 projecting radially outwards from the trigger button in the corresponding trigger direction. The firing lane 302 indicates the direction and extent of a swipe input required for triggering deployment of the relevant ability. Each firing lane 302 is in this example embodiment capped by a semicircular bumper 304 at the distal end of the firing lane 302. Display of the firing lane 302 promotes ready identification by the user of those abilities that are available for deployment. Note that when an ability becomes available (i.e., reaches a full charge level) while the abilities widget 112 is in the active mode, it automatically results in immediate extension of the corresponding firing lane 302. If the abilities widget 112 is released without firing any of the available abilities, the firing lane 302 of each availability is automatically retracted, returning it to the abilities widget 112 to the configuration shown in FIG. 2. Selective deployment of an in-game ability by use of the abilities widget 112 will now be described by way of example with reference to launching a rocket using the rocket button 208. To deploy any of the available abilities or skills, the user swipes from the central pad 210 in the trigger direction of the chosen ability (indicated by the radial direction of the associated firing lane 302). In this instance, the user thus slides a finger in contact with the touchscreen 104 horizontally leftwards from the central pad 210. Responsive to this swipe gesture, the selected trigger button slides radially outwards towards the lane bumper 304. In this instance, the button thus slides leftwards with the swipe gesture, as shown schematically in FIG. 4.

Every firing lane 302 other than that of the selected ability is automatically retracted into the abilities widget 112. In the present example, the firing lane 302 of the ping button 202 is thus retracted when animated sliding of the rocket button 208 begins, as again shown in FIG. 4. In some embodiments, deployment of the selected ability is performed upon release of the selected trigger button. Thus, in the example embodiment of FIG. 4, the user would slide the rocket button 208 to the extreme left position shown, would optionally delay deployment of the rocket by maintaining contact with the touchscreen 104, and can precisely time the instant of rocket deployment by releasing the rocket button 208 at the desired moment. In this embodiment, however, abilities other than that of the grenade button 206 are deployed immediately when the selected trigger button has traveled a predefined threshold distance along the corresponding firing lane 302. Thus, the selected rocket launch is automatically performed when the rocket button 208 is brought up against the bumper 304 of its firing lane 302. When the selected ability is deployed, a feedback flash is produced by the touchscreen 104 to indicate or confirm that the option has been activated. In some embodiments, triggering of the ability can be confirmed by a tactile indication such as a phone vibration.

After firing a particular ability, the selected trigger button and firing lane 302 are retracted inwards, and the fired trigger button is returned to charging mode for the predefined cooldown period. The operations described above in engaging the abilities widget 112 and firing a selected ability by swipe gesture typically consumes less than one second. Note that the firing lanes 302 for abilities in the cooldown period (and in some instances for locked abilities that are not merely recharging but are persistetly unavailable to the user) do not expand. Swiping in the direction of a locked or charging trigger button has no effect. The user can in such case return touch contact to the central pad 210, or can release contact to no effect. For some skills or abilities, the abilities widget 112 can in some embodiments provide aiming functionality. In this example embodiment, aiming functionality via the abilities widget 112 is provided for the grenade button 206. To cause the player character 108 to throw a grenade, the user thus swipes the grenade button 206 (when fully charged) downwards and continues to hold contact with the touchscreen 104. An aiming mode is automatically entered, in which a visual trajectory and/or landing zone for the grenade within the virtual world is shown in the game display 106. The user can now aim the grenade by vertical finger movement to vary the distance of the throw, and by horizontal movement to change the direction of the throw. When the user releases the grenade button 206, the grenade is launched according to the selected trajectory. As mentioned, the central pad 210 in this example embodiment provides a help functionality, as indicated by the help icon displayed thereon. In this instance, tapping and holding contact with the abilities widget 112 for longer than a predefined threshold duration (in this example, one second) automatically invokes a helper overlay panel explaining character abilities and location of the abilities on the abilities widget 112. Lifting contact immediately dismisses the overlay. Repeated tapping in the abilities control area 508 without holding (e.g., an above-threshold number of taps within a predefined period, for example two or more taps within one second) causes display of a message saying "tap and hold for help."

Figure 6:
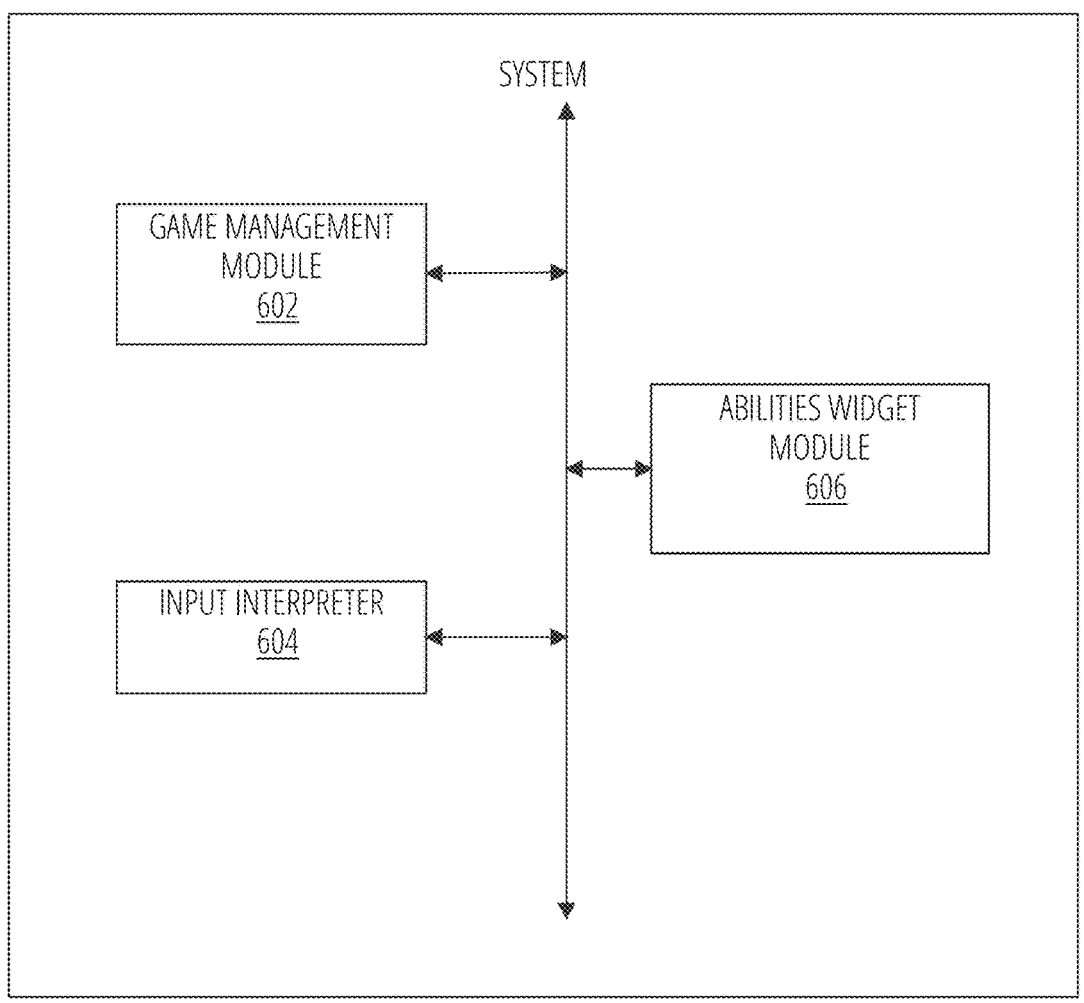
FIG. 6 is a schematic block diagram illustrating various hardware-implemented modules of a system for providing a game user interface according with one example embodiment.
Figure 10:
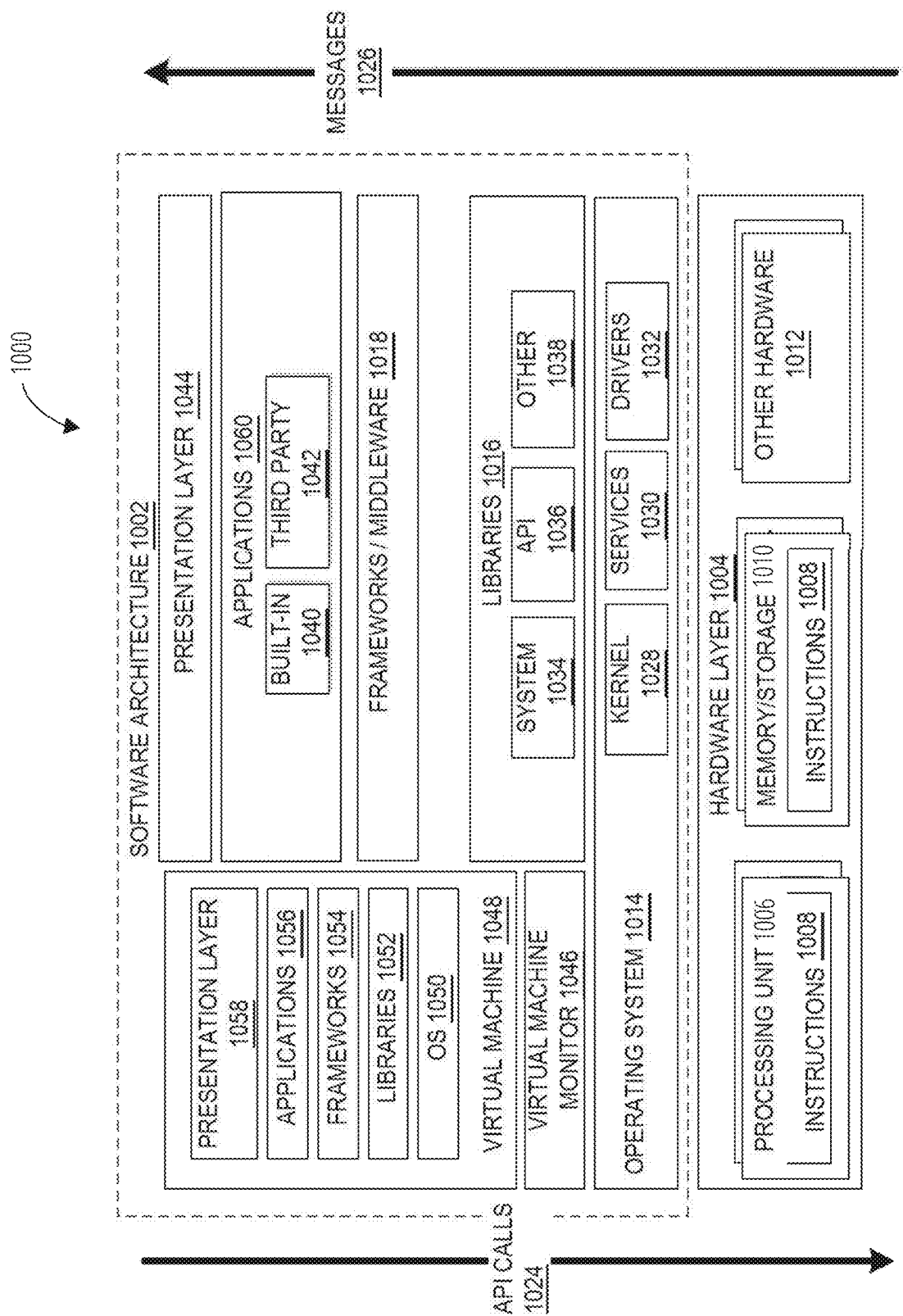
FIG. 10 is a block diagram illustrating an example of a software architecture that may be installed on a machine to provide a system for hosting a computer-implemented game having an interactive game interface according to some example embodiments.
Figure 11:
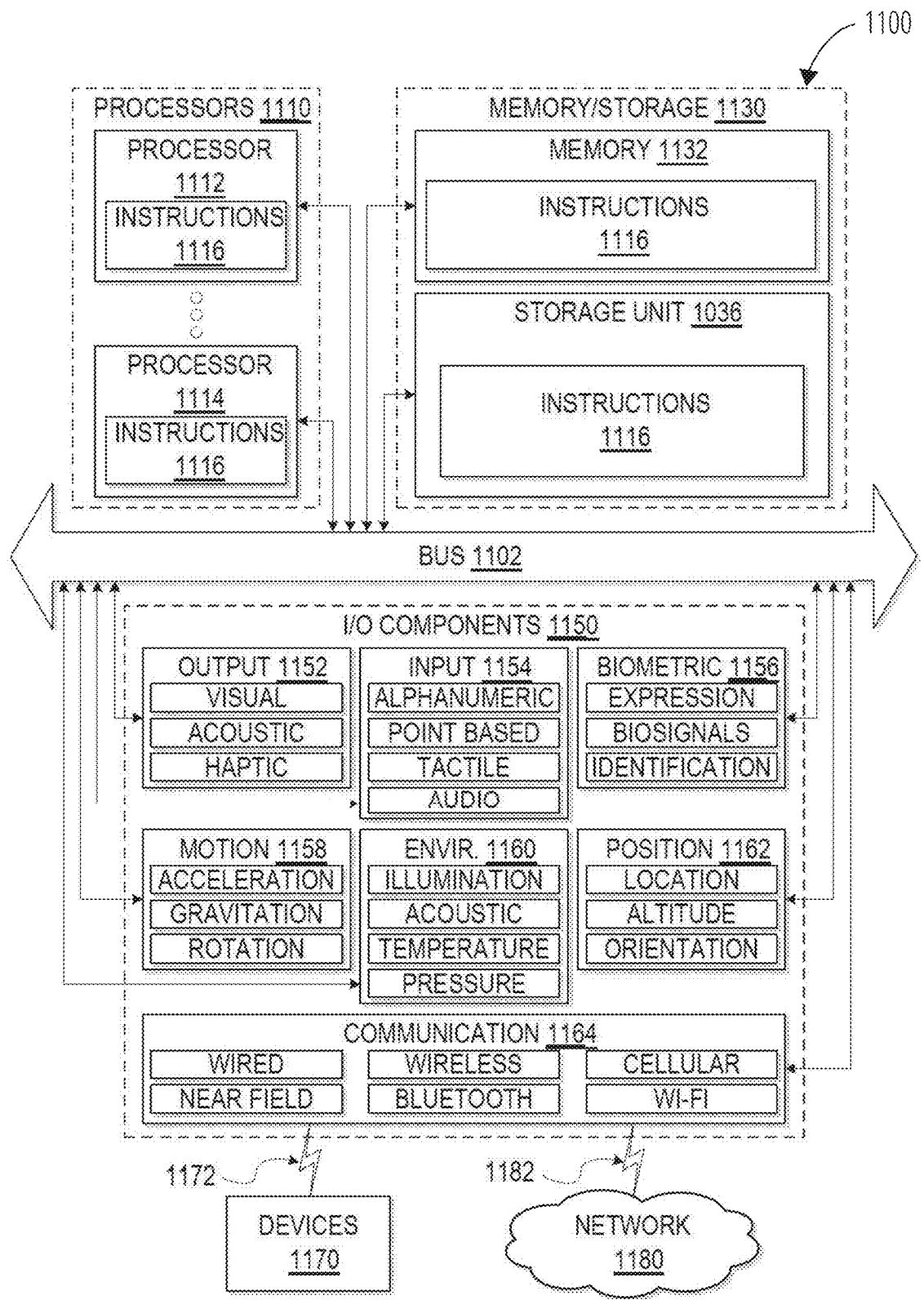
FIG. 11 is a diagrammatic representation of the machine in the form of a computer system within which a set of instructions is executable for causing the machine to perform any one or more of the methodologies discussed herein, according to an example embodiment.

FIG. 6 is a schematic block diagram of (in the example embodiment of FIG. 1 through FIG. 5 being provided by a portable electronic device in the form of a mobile phone X), in accordance with an example embodiment. The system 600 comprises a number of different hardware-implemented modules, units, or other means configured for automated performance of associated operations, as described in greater detail elsewhere herein. The various components may, in some embodiments, be provided by permanently configured circuit arrangements, and may, in other embodiments, be provided by software executing on one or more dynamically reconfigurable processor devices, thereby to configure the processor devices sequentially, or in parallel, to provide the respective hardware-implemented modules. FIG. 10 and FIG. 11 provide software and hardware architectures one such embodiment. In some embodiments, the system 600 may be provided by server-side components, for example being provided by a game server communicating with a mobile electronic device such as the mobile phone 102 to execute the game on the mobile phone 102 as a client device. In other embodiments, the system 600 is provided by the mobile phone 102 executing custom software.

The system 600 includes a game management module 602 configured for hosting the computer-implemented game, controlling in game behavior of the player character 108 and providing the game display 106 on the touchscreen 104.

An input interpreter 604 is provided to receive and interpret user input provide with respect to the game via the touchscreen 104. In particular, the input interpreter 604 is configured automatically to receive touch input via the touchscreen 104, to identify whether the touch input is directed to controlling movement, aim direction, or ability deployment (consistent in one example embodiment with the methodologies described with reference to FIG. 5), and to interpret swipe gestures received in the abilities control area 508 to identify the swipe direction of such swipe gestures.

The system 600 further includes an abilities widget module 606 configured to automatically control behavior of the abilities control widget as described with reference to the example embodiment of FIG. 1 through FIG. 5, and to implement an example method as described below.

Figure 7:
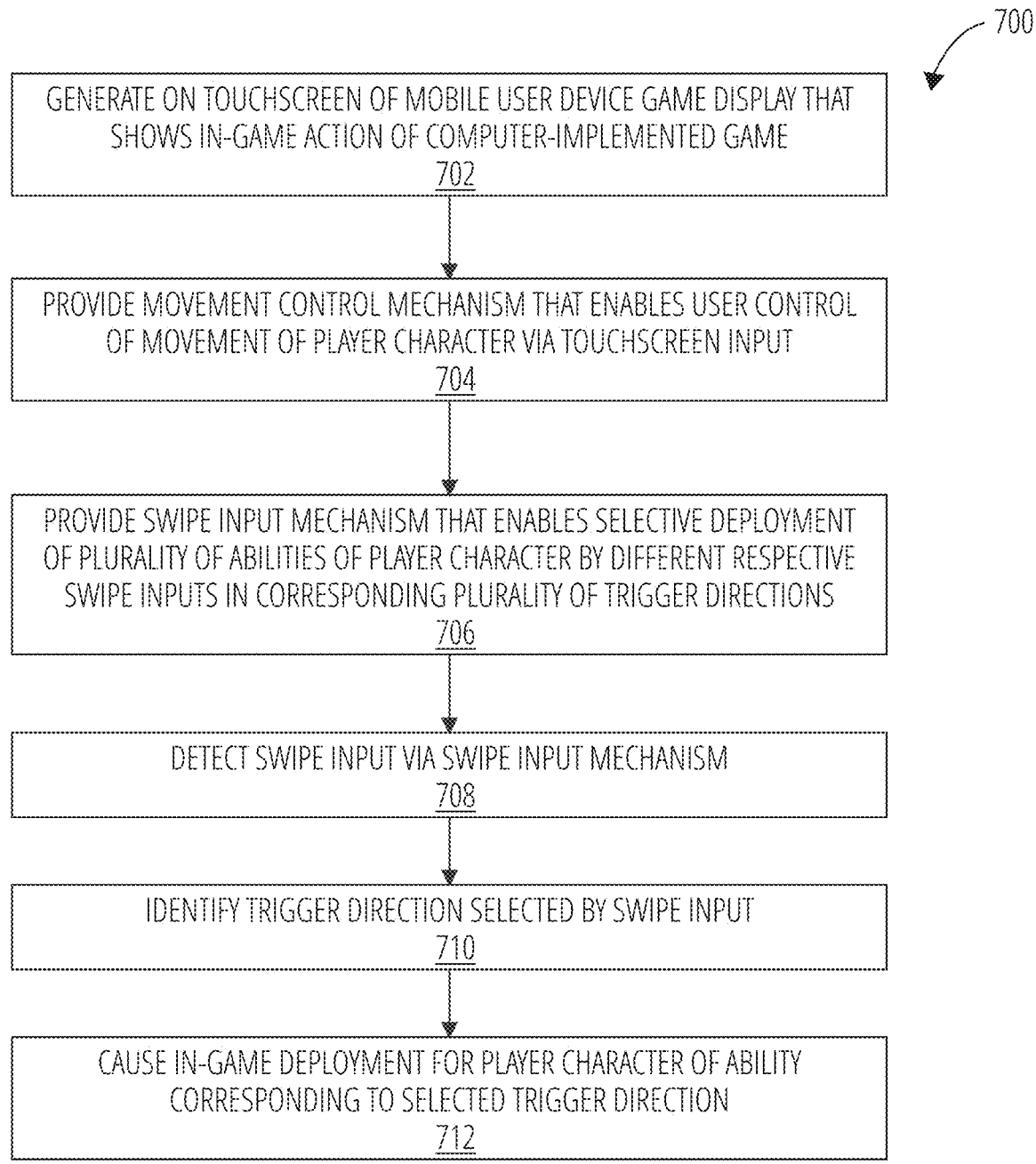
FIG. 7 is a schematic high-level flow diagram of a method of providing a game user interface, according to one example embodiment

FIG. 7 shows a high-level flowchart of an example method according to an example embodiment. The method 700 is in this example embodiment performed by the mobile phone 102 (which provides a system 600 consistent with FIG. 6 and the architecture of FIG. 10 and FIG. 11), consistent with the example embodiment illustrated in FIG. 1 through FIG. 5.

At operation 702, method 700 generates on the touchscreen 104 of a mobile user device (e.g., the mobile phone 102, FIG. 1) a game display 106 that shows in-game action of a computer-implemented game, the in-game action comprising user-controlled movement of the player character 108 within a virtual world. At operation 704, a movement control mechanism is provided that enables user control of movement of the player character 108 via touchscreen input. In this example embodiment, the movement control mechanism enables control of player movement using touch input in the movement control area 504 (FIG. 1).

At operation 706, method 700 provides a swipe input mechanism that enables selective deployment of a plurality of abilities of the player character 108 by different respective swipe inputs via the touchscreen 104 in a corresponding plurality of trigger directions. In the example embodiment under discussion, the swipe input mechanism comprises the abilities control abilities widget 112 (FIG. 1 through FIG. 4), with the plurality of trigger directions being the four cardinal directions associated with the abilities indicated by the four trigger button icons 212 discussed with reference to FIG. 2. At operation 708, method 700 detects a swipe input via the swipe input mechanism, e.g. comprising a leftward swipe on the abilities widget 112 as illustrated in FIG. 4. At operation 710, method 700 identifies the trigger direction selected by the swipe input, in the example embodiment of FIG. 4 identifying the horizontal leftward swipe direction. At operation 712, method 700 causes in-game deployment for the player character 108 of that one of the plurality of abilities which corresponds to the selected trigger direction, in the example embodiment of FIG. 4 being deployment of a rocket, as described previously.

Figure 8:
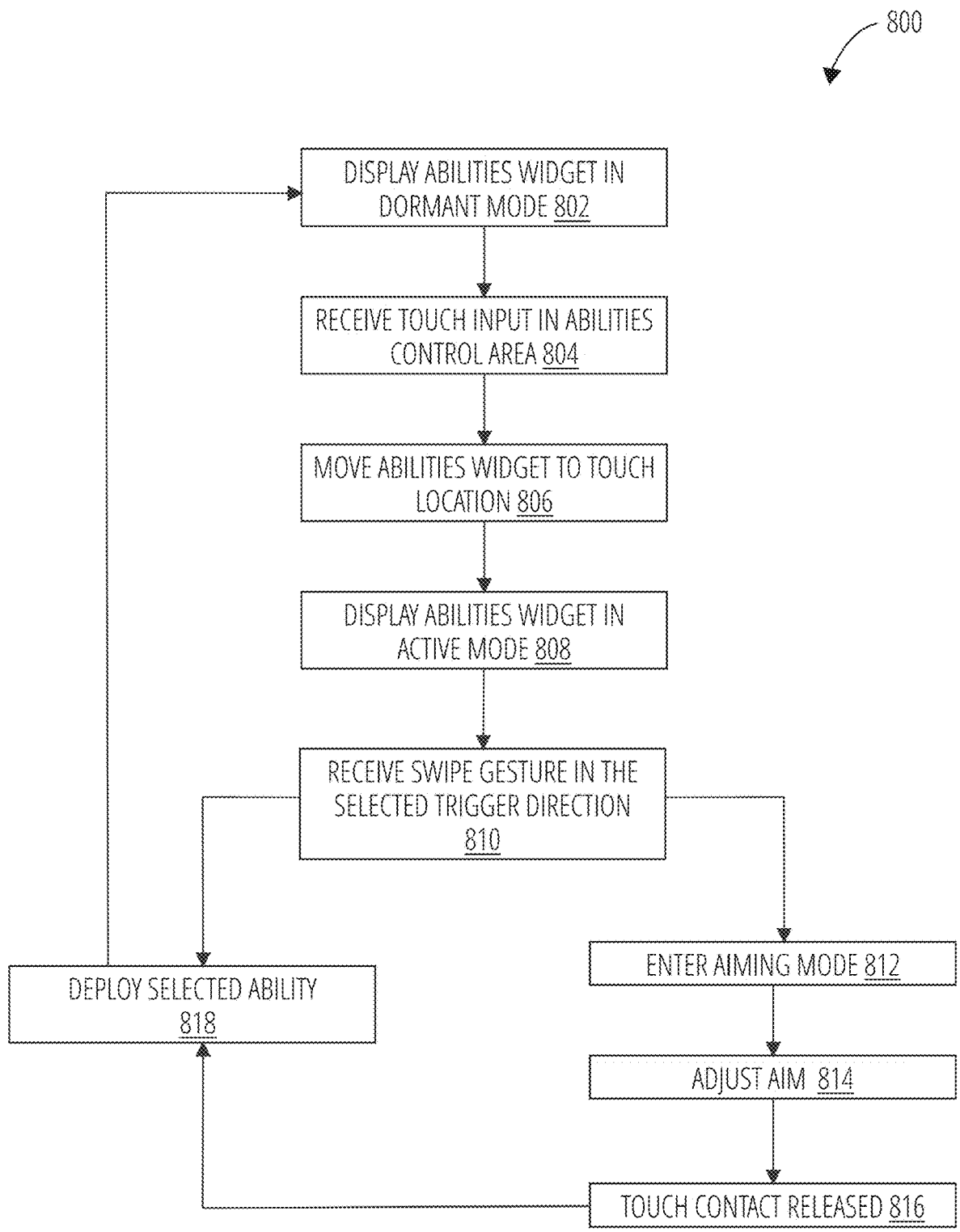
FIG. 8 is a more detailed flow diagram of the method of FIG. 7, according to one example embodiment.

FIG. 8 shows a more detailed flowchart of a method 800 of providing a game user interface according to an example embodiment. The method 800 is in this example embodiment performed by the mobile phone 102 (which provides a system 600 consistent with FIG. 6 and the architecture of FIG. 10 and FIG. 11), consistent with the example embodiment illustrated in FIG. 1 through FIG. 5.

At operation 802, there is no touch contact in the abilities control area 508 (FIG. 5) and the abilities widget 112 is thus displayed in the dormant mode (FIG. 2) in which it is radially contracted. At operation 804, touch input is detected in the abilities control area 508, and responsive to the touch contact being sustained for an above-threshold interval, the touch contact is identified as being intended for initiation of a swipe gesture.

Responsive to detecting the touch contact for swiping, the abilities widget 112 is immediately moved, at operation 804, such that the center of the abilities widget 112 (in this example embodiment, the central pad) is located at the location of the touch input. At operation 808, the abilities widget 112 is switched to the active mode, in this example embodiment comprising expanding the firing lane 302 for each ability that is available for selection. At operation 810, a swipe gesture is received extending radially outwards from the central pad 210, and the system automatically identifies the trigger direction thus selected. It will be appreciated that such trigger direction identification is based in part on predefined tolerances for the precise direction swiped, and can employ a triage algorithm for automated disambiguation in borderline cases. If the selected ability is a non-aiming ability (e.g., a rocket, map look, or grappling hook in the example embodiment of FIG. 2) then the selected ability is deployed, at operation 818 when the selected trigger button (e.g., the rocket button 208 in FIG. 4) is swiped to the firing position (or, in some embodiments, when the swiped button is released). If, however, the selected ability is an ability supported by aiming (e.g., the grappling hook button 204), the aiming mode is entered, at operation 812.

As described previously, the aiming mode comprises displaying a trajectory or the target area. At operation 814, the aim is adjusted manually by the user by sustaining touch contact and moving the point of contact to correspond with the desired trajectory and/or target area). At operation 816, the touch contact is released, responsive to which the selected ability is deployed (e.g., the grenade is thrown), at operation 818. After deployment of the selected ability at operation 818 (or upon release of the sustained touch contact before operation 810), the abilities widget 112 is returned to the dormant mode, at operation 802. Benefits of the disclosed techniques include improved accuracy, and speed of receiving and interpreting user input when compared to existing techniques. Allowing selection of different abilities by swiping in different directions is more tolerant and less prone to error than requiring the selection of the precise on-screen position of a soft button, for example. There is also a greater subjectively experienced difference between swiping in two directions that are at least 90° apart than by selecting soft buttons that may be located right next to each other on-screen.

Input accuracy is further promoted by the auto-adjusting floating location of abilities widget 112, so that the user need not select the precise location of the widget center, as is the case with conventional button presses. In this respect, it is to be appreciated that the user interface elements at the lateral end of the touchscreen is typically obscured by the user's thumb during gameplay, which makes accurate option selection in conventional interfaces challenging, but is a virtual irrelevancy with the floating swipe input mechanisms disclosed herein.

Figure 9:
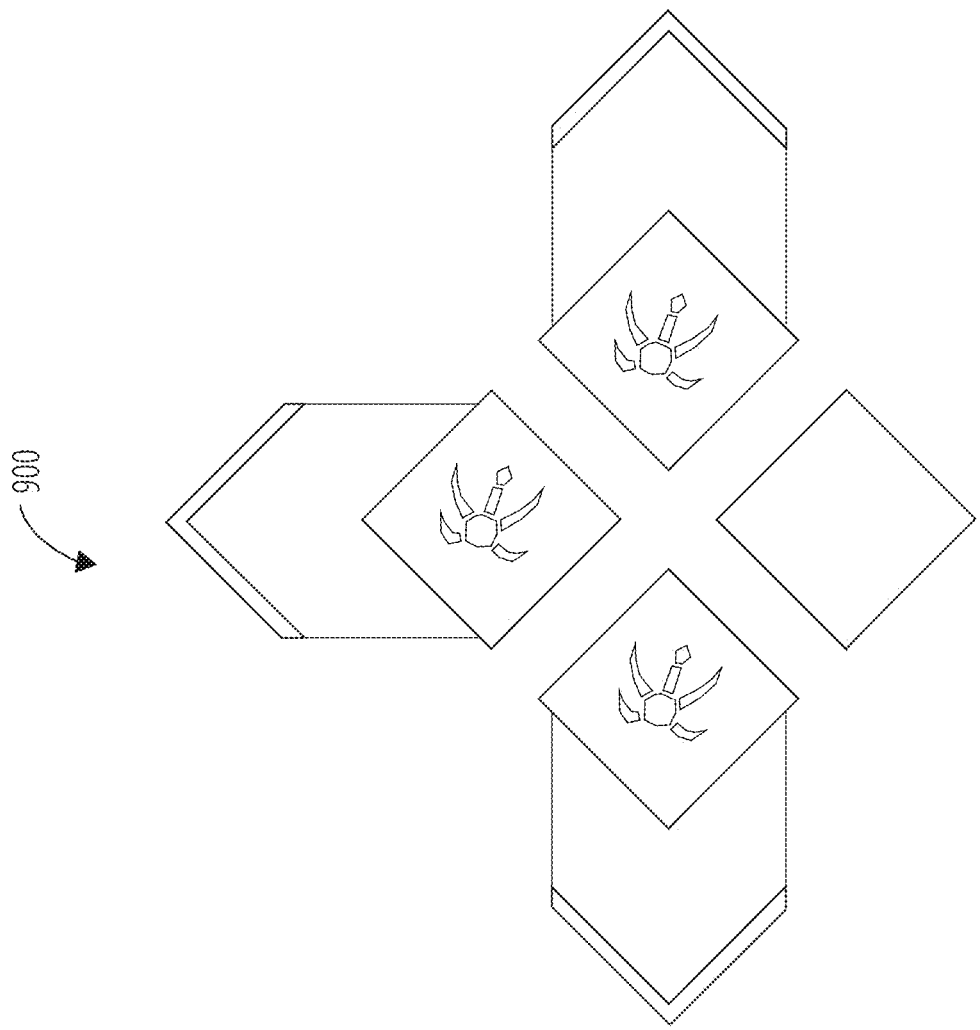
FIG. 9 show an abilities widget in accordance to another example embodiment, the abilities widget being shown in a dormant mode (left) and an active mode (right).
Figure 9:
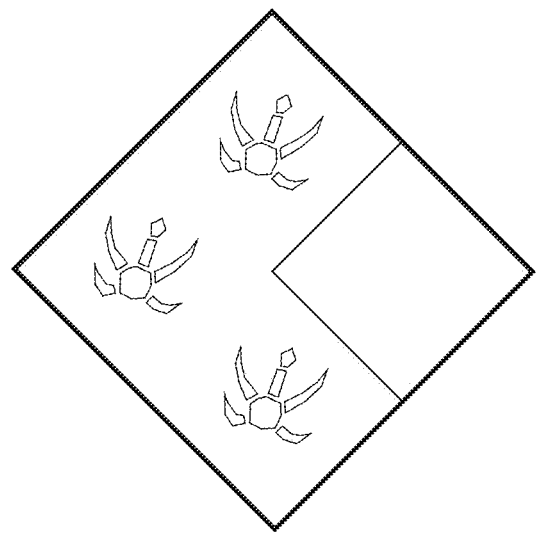

It will be appreciated that the particular shape and configuration of the abilities widget 112 discussed previously is but one example configuration for a swipe input mechanism consistent with this disclosure, and that different shapes, configurations, and selectable skills/abilities/functions are possible in other embodiments. FIG. 9 shows one such alternative embodiment of a diamond-shaped swipe menu 900.

The swipe menu 900 functions similarly to the example abilities widget 112 discussed previously, a main distinction being that the respective swipable abilities elements are provided by four squares 902 oriented at a 45° angle. The swipe menu 900 further has no selectable UI element like the central pad 210 at its center. Instead, the swipe menu 900 is in the dormant mode (FIG. 9A) fully contracted so that the four selectable squares are in abutment to form a compact unified square. Upon receiving touch input in the abilities control area 508, as described before, the four selectable squares separate and move apart radially, being centered on the touch point. As before, firing lanes 302 capped off by chevron-shaped bumpers extend radially from each square that is available for selection.

It will be appreciated that many such variations are possible without diverging from the scope of the techniques described herein.

Modules, Components, and Logic

Certain embodiments are described herein as including logic or a number of components, modules, or mechanisms. Examples of such components include the game management module 602, the input interpreter 604, and the abilities widget module 606, described with reference to FIG. 6. it will be appreciated that different modules may in other embodiments be used to perform the techniques described with reference to FIG. 1 through FIG. 9. Such components or modules may constitute either software modules (e.g., code embodied on a machine-readable medium) or hardware modules/components. A "hardware module/component is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In such cases, the various described hardware modules of a system or machine to perform the disclosed operations may not at any time have all of the modules described as forming part of the system or machine. Instead, a reconfigurable computer processor (e.g., a CPU) may, at various times, be configured by execution of specific software to form different corresponding modules.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or reconfigurable circuitry that is temporarily configured by software to perform certain operations. For example, a hardware module may include software executed by a computer processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module or component, or reference to a processor configured to perform specified operations should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. As mentioned earlier in respect to embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIG. 1 through FIG. 9 are implemented in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things", while yet another combination produces a server computer for use within a cloud computing architecture. Not all combinations of such software and hardware architectures are presented here as those of skill in the art can readily understand how to implement various embodiments consistent with this disclosure in different contexts from the disclosure contained herein.

Software Architecture

FIG. 10 is a block diagram 1000 illustrating a representative software architecture 1002, which may be used in conjunction with various hardware architectures herein described. FIG. 10 is merely a non-limiting example of a software architecture and it will be appreciated that many other architectures may be implemented to facilitate the functionality described herein. The software architecture 1002 may be executing on hardware such as machine 1100 of FIG. 11 that includes, among other things, processors 1110, memory 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. Executable instructions 1008 represent the executable instructions of the software architecture 1002, including implementation of the methods, modules and so forth of FIG. 1 through FIG. 9. Hardware layer 1004 also includes memory and/or storage modules 1010, which also have executable instructions 1008. Hardware layer 1004 may also comprise other hardware as indicated by 1012 which represents any other hardware of the hardware layer 1004, such as the other hardware illustrated as part of machine 1100.

In the example architecture of FIG. 10, the software 1002 may be conceptualized as a stack of layers where each layer provides particular functionality. For example, the software 1002 may include layers such as an operating system 1014, libraries 1016, frameworks/middleware 1018, applications 1060 and presentation layer 1044. Operationally, the applications 1060 and/or other components within the layers may invoke application programming interface (API) calls 1024 through the software stack and receive a response, returned values, and so forth illustrated as messages 1026 in response to the API calls 1024. The layers illustrated are representative in nature and not all software architectures have all layers. For example, some mobile or special purpose operating systems 1014 may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1060 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may, also include a wide variety of other libraries 1038 to provide many other APIs to the applications 1060 and other software components/modules.

The frameworks 1018 (also sometimes referred to as middleware) may provide a higher-level common infrastructure that may be utilized by the applications 1060 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1060 and/or other software components/modules, some of which may be specific to a particular operating system 1014 or platform.

The applications 1060 includes built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications 1040 as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems 1014. In this example, the third party application 1042 may invoke the API calls 1024 provided by the mobile operating system such as operating system 1014 to facilitate functionality described herein.

The applications 1060 may utilize built in operating system functions (e.g., kernel 1028, services 1030 and/or drivers 1032), libraries 1016 (e.g., system 1034, APIs 1036, and other libraries 1038), and frameworks/middleware 1018 to create user interfaces to interact with users 206 of the system 202. Alternatively, or additionally, in some systems, interactions with a user 206 may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine 1048 creates a software environment where applications/modules can execute as if they were executing on a hardware machine (such as the machine 1100 of FIG. 11, for example). A virtual machine 1048 is hosted by a host operating system (operating system 1014 in FIG. 10) and typically, although not always, has a virtual machine monitor 1046, which manages the operation of the virtual machine 1048 as well as the interface with the host operating system (i.e., operating system 1014). A software architecture executes within the virtual machine 1048 such as an operating system 1050, libraries 1052, frameworks/middleware 1054, applications 1056 and/or presentation layer 1058. These layers of software architecture executing within the virtual machine 1048 can be the same as corresponding layers previously described or may be different.

Example Machine Architecture and Machine-Readable Medium

FIG. 11 is a block diagram illustrating components of a machine 1100, according to some example embodiments, able to read instructions 1008 from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the flow diagrams of FIG. 7 and FIG. 8, and may cause the machine 1100 to provide the abilities widget functionality of FIG. 1 through FIG. 5, in which embodiment the machine 1100 is provided in the example form of the mobile phone 102. Additionally, or alternatively, the instructions 1116 may implement the respective modules of FIG. 6 and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 1112 and processor 1114 that may execute instructions 1116. The term "processor" is intended to include a multi-core processor 1110 that may comprise two or more independent processors 1112, 1114 (sometimes referred to as "cores") that may execute instructions 1116 contemporaneously. Although FIG. 11 shows multiple processors 1112, 1114, the machine 1100 may include a single processor 1110 with a single core, a single processor 1110 with multiple cores (e.g., a multi-core process), multiple processors 1110 with a single core, multiple processors 1110 with multiples cores, or any combination thereof.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116, embodying any one or more of the methodologies or functions described herein. The instructions 1116 may also reside, completely or partially, within the memory 1132, within the storage unit 1136, within at least one of the processors 1110 (e.g., within the processor 1110's cache memory), or any suitable combination thereof, during execution thereof by the machine 1100. Accordingly, the memory 1132, the storage unit 1136, and the memory of processors 1110 are examples of machine-readable media.

As used herein, "machine-readable medium" means a device able to store instructions 1116 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media e.g., a centralized or distributed database 226, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via coupling 1182 and coupling 1172 respectively. For example, the communication components 1164 may include a network interface component or other suitable device to interface with the network 1180. In further examples, communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or other type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to devices 1170. The term "transmission medium" shall be taken to include any intangible medium that is capable of storing, encoding, or carrying instructions 1116 for execution by the machine 1100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed:

1. A method comprising:
generating on a touchscreen of a mobile user device a game display that shows in-game action of a computer-implemented game, the in-game action comprising user-controlled movement of a player character within a virtual world;
providing a movement control mechanism that enables user control of movement of the player character via touchscreen input;
providing a swipe input mechanism that provides a plurality of predefined trigger directions or a corresponding plurality of abilities of the player character, each ability being selectively deployable via a respective touchscreen swipe input in a direction associated with the respectively corresponding trigger direction, the swipe input mechanism comprising:
a controller widget displayed on the touchscreen, the plurality of trigger directions extending radially from the controller widget; and
a plurality of trigger buttons corresponding to the plurality of abilities of the player character, each trigger button being a graphic user interface element incorporated in the controller widget;
detecting via the swipe input mechanism a swipe input having a swipe direction that extends radially outwards from the controller widget;
determining that the swipe direction falls within a predefined tolerance range of a matching one of the plurality of trigger directions, and identifying said matching trigger direction as a selected trigger direction, that one of the plurality of abilities which corresponds to the selected trigger direction being identified as a selected ability;
responsive to the detected swipe input, displaying animated sliding movement relative to the controller widget in the selected trigger direction of that one of the plurality of trigger buttons which corresponds to the selected ability, such that the animated sliding movement shows the respective trigger button moving away from the controller widget in the selected trigger direction in synchronicity with the swipe input; and
causing in-game deployment for the player character of that one of the selected ability.

2. The method of claim 1, wherein the providing of the swipe input mechanism comprises displaying the controller widget as part of a heads-up display (HUD) overlaid on the game display, the plurality of trigger directions extending radially relative to an input zero point defined by the abilities widget, at least two of the plurality of trigger directions being transverse to one another and intersecting at the input zero point.

3. The method of claim 2, wherein the plurality of trigger buttons are arranged circumferentially about the input zero point, each trigger button being radially outwardly slidable in the corresponding trigger direction responsive to selection thereof by a swipe input having a corresponding swipe direction.

4. The method of claim 3, further comprising:
switching one or more of the plurality of trigger buttons between:

a ready state in which the corresponding ability is available for selection, and an unready state in which the corresponding ability is unavailable for selection; and responsive to switching a particular trigger button between the ready state and the unready state, providing a visual indication of the switching by varying one or more visual attributes of the particular trigger button.

5. The method of claim 4, wherein the unready state for at least one of the plurality of trigger buttons comprises a charging mode in which a charge level for the corresponding ability progressively increases towards a predefined charge threshold at which the trigger button automatically switches to the ready state, the method further comprising displaying in association with the respective trigger button a dynamic charge indicator that graphically indicates the charge level for the corresponding ability.

6. The method of claim 5, wherein switching the particular trigger button to the ready state comprises extending a firing lane radially outwards from the particular trigger button, the corresponding trigger button being slidable along the firing lane, wherein the firing lane is in the unready state in a radially retracted condition.

7. The method of claim 3, wherein the controller widget has a dynamically variable on-screen position that automatically adjusts to an origin point for the swipe input.

8. The method of claim 7, the method further comprising:
prior to receiving the swipe input, detecting initiation of touch contact for swipe control of the controller widget;
identifying on-screen coordinates of the touch contact initiation as the origin point for swipe input; and
automatically adjusting the on-screen position of the controller widget such the input zero point of the controller widget is located at the identified origin point.

9. The method of claim 8, wherein the detection of touch contact for swipe control of the controller widget is limited to a predefined abilities control area that forms a subset of a total input-receptive area of the touchscreen, the method comprising detecting a touch input as initiation of touch contact for swipe control of the controller widget responsive to and conditional upon satisfaction of on a set of criteria comprising:
that the touch input is received in the abilities control area; and
that the touch input is sustained for longer than a predefined threshold interval.

10. The method of any one of claim 1, wherein the in-game deployment of the selected ability comprises:
entering an aiming mode in which a trajectory or a target area for the selected ability is displayed while touch contact that provided the swipe input is sustained;
changing the displayed trajectory or target area responsive to user-provided change in position of the sustained touch contact; and
upon release of the touch contact, deploying the selected ability according to the displayed trajectory or target area.

11. A device comprising:
a touchscreen;
one or more processors; and
a memory storing instructions that, when executed by the one or more processors, configure the device to perform operations comprising:
generating on a touchscreen of a mobile user device a game display that shows in-game action of a computer-implemented game, the in-game action comprising user-controlled movement of a player character within a virtual world;
providing a movement control mechanism that enables user control of movement of the player character via touchscreen input;
providing a swipe input mechanism that provides a plurality of predefined trigger directions or a corresponding plurality of abilities of the player character, each ability being selectively deployable via a respective touchscreen swipe input in a direction associated with the respectively corresponding trigger-direction, the swipe input mechanism comprising:
a controller widget displayed on the touchscreen, the plurality of trigger directions extending radially from the controller widget; and
a plurality of trigger buttons corresponding to the plurality of abilities of the player character, each trigger button being a graphic user interface element incorporated in the controller widget;
detecting via the swipe input mechanism a swipe input having a swipe direction that extends radially outwards from the controller widget;
determining that the swipe direction falls within a predefined tolerance range of a matching one of the plurality of trigger directions, and identifying said matching trigger direction as a selected trigger direction, that one of the plurality of abilities which corresponds to the selected trigger direction being identified as a selected ability;
responsive to the detected swipe input, displaying animated sliding movement relative to the controller widget in the selected trigger direction of that one of the plurality of trigger buttons which corresponds to the selected ability, such that the animated sliding movement shows the respective trigger button moving away from the controller widget in the selected trigger direction in synchronicity with the swipe input; and
causing in-game deployment for the player character of that one of the selected ability.

12. The device of claim 11, wherein the instructions further configure the device to:
enter an aiming mode in which a trajectory or a target area for the selected ability is displayed while touch contact that provided the swipe input is sustained;
change the displayed trajectory or target area responsive to user-provided change in position of the sustained touch contact; and
upon release of the touch contact, deploying the selected ability according to the displayed trajectory or target area.

13. The device of claim 11, wherein the instructions configure the device to display the controller widget as part of a heads-up display (HUD) overlaid on the game display, the plurality of trigger directions extending radially relative to an input zero point defined by the abilities widget, at least two of the plurality of trigger directions being transverse to one another and intersecting at the input zero point.

14. The device of claim 13, wherein the plurality of trigger buttons are arranged circumferentially about the input zero point, each trigger button being radially outwardly slidable in the corresponding trigger direction responsive to selection thereof by a swipe input having a corresponding swipe direction.

15. The device of claim 14, wherein the instructions configure the device to perform further operations comprising:
  switching one or more of the plurality of trigger buttons between:
    a ready state in which the corresponding ability is available for selection, and
    an unready state in which the corresponding ability is unavailable for selection; and
  responsive to switching a particular trigger button between the ready state and the unready state, providing a visual indication of the switching by varying one or more visual attributes of the particular trigger button.

16. The device of claim 13, wherein the instructions further configure the device to:
  prior to receiving the swipe input, detecting initiation of touch contact for swipe control of the controller widget;
  identify on-screen coordinates of the touch contact initiation as an origin point for swipe input; and
  automatically adjust an on-screen position of the controller widget such the input zero point of the controller widget is located at the identified origin point.

17. The device of claim 16, wherein the detection of touch contact for swipe control of the controller widget is limited to a predefined abilities control area that forms a subset of a total input-receptive area of the touchscreen, the instructions configuring the device to detect a touch input as initiation of touch contact for swipe control of the controller widget responsive to and conditional upon satisfaction of on a set of criteria comprising:
  that the touch input is received in the abilities control area; and
  that the touch input is sustained for longer than a predefined threshold interval.

18. A non-transitory computer-readable storage medium, the computer-readable storage medium including instructions that when executed by a computer, cause the computer to perform operations comprising:
  generating on a touchscreen of a mobile user device a game display that shows in-game action of a computer-implemented game, the in-game action comprising user-controlled movement of a player character within a virtual world;
  providing a movement control mechanism that enables user control of movement of the player character via touchscreen input;
  providing a swipe input mechanism that provides a plurality of predefined trigger directions or a corresponding plurality of abilities of the player character, each ability being selectively deployable via a respective touchscreen swipe input in a direction associated with the respectively corresponding trigger direction, the swipe input mechanism comprising:
    a controller widget displayed on the touchscreen, the plurality of trigger directions extending radially from the controller widget; and
    a plurality of trigger buttons corresponding to the plurality of abilities of the player character, each trigger button being a graphic user interface element incorporated in the controller widget;
  detecting via the swipe input mechanism a swipe input having a swipe direction that extends radially outwards from the controller widget;
  determining that the swipe direction falls within a predefined tolerance range of a matching one of the plurality of trigger directions, and identifying said matching trigger direction as a selected trigger direction, that one of the plurality of abilities which corresponds to the selected trigger direction being identified as a selected ability;
  responsive to the detected swipe input, displaying animated sliding movement relative to the controller widget in the selected trigger direction of that one of the plurality of trigger buttons which corresponds to the selected ability, such that the animated sliding movement shows the respective trigger button moving away from the controller widget in the selected trigger direction in synchronicity with the swipe input; and
  causing in-game deployment for the player character of that one of the selected ability.

* * * * *

UNITED STATES PATENT AND TRADEMARK OFFICE
CERTIFICATE OF CORRECTION

PATENT NO. : 11,623,135 B2
APPLICATION NO. : 17/362383
DATED : April 11, 2023
INVENTOR(S) : Hemby et al.

Page 1 of 2

It is certified that error appears in the above-identified patent and that said Letters Patent is hereby corrected as shown below:

On the Title Page

On page 2, in Column 2, item [56], Line 15, delete "Bang—Garneplay alkthrough" and insert --Bang-Gameplay Walkthrough-- therefor In the Specification In Column 2, Line 19, delete "(e.g.;" and insert --(e.g.,-- therefor In Column 2, Line 56, delete "element;" and insert --element,-- therefor In Column 3, Line 29, delete "TUE" and insert --THE-- therefor In Column 5, Line 46, delete "widget." and insert --widget-- therefor In Column 5, Line 65, delete "102." and insert --108.-- therefor In Column 10, Line 38, delete "accuracy," and insert --accuracy-- therefor In Column 14, Line 40, delete "may," and insert --may-- therefor In Column 16, Line 57, before "e.g.,", insert --(--

In Column 18, Line 45, delete "(WAN)," and insert --(WWAN),-- therefor

In Column 18, Line 65, delete "(UNITS)," and insert --(UMTS),-- therefor

In the Claims

In Column 20, Line 18, in Claim 1, delete "or" and insert --for-- therefor

Signed and Sealed this
Twenty-seventh Day of June, 2023

Katherine Kelly Vidal
*Director of the United States Patent and Trademark Office*

In Column 22, Line 7, in Claim 11, delete "or" and insert --for-- therefor

In Column 24, Line 8, in Claim 18, delete "or" and insert --for-- therefor